United States Patent
Toda et al.

(10) Patent No.: US 9,369,069 B2
(45) Date of Patent: Jun. 14, 2016

(54) CONTROL DEVICE OF FAN MOTOR

(71) Applicant: SANYO DENKI CO., LTD., Tokyo (JP)

(72) Inventors: Takahisa Toda, Tokyo (JP); Takashi Kaise, Tokyo (JP); Jiro Watanabe, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 14/490,152

(22) Filed: Sep. 18, 2014

(65) Prior Publication Data

US 2015/0084564 A1 Mar. 26, 2015

(30) Foreign Application Priority Data

Sep. 20, 2013 (JP) ................................. 2013-196058

(51) Int. Cl.
*H02P 27/04* (2006.01)
*H02P 6/00* (2016.01)
*H02P 6/08* (2016.01)
*H02P 6/14* (2016.01)

(52) U.S. Cl.
CPC *H02P 6/002* (2013.01); *H02P 6/08* (2013.01); *H02P 6/14* (2013.01)

(58) Field of Classification Search
CPC ............. H02P 3/00; H02P 6/001; H02P 7/06; H02P 25/026
USPC ............. 318/400.01, 400.07, 400.14, 400.15, 318/599, 801, 811, 805, 721, 799; 363/40, 363/44, 52, 55, 84
See application file for complete search history.

(56) References Cited

U.S. PATENT DOCUMENTS

| | | | |
|---|---|---|---|
| 6,198,240 B1 * | 3/2001 | Notohara et al. | 318/268 |
| 6,882,122 B1 | 4/2005 | Sutter et al. | |
| 7,330,011 B2 * | 2/2008 | Ueda et al. | H02P 25/026 318/400.04 |
| 2001/0001227 A1 * | 5/2001 | Notohara et al. | 318/268 |
| 2008/0253750 A1 | 10/2008 | Lin et al. | |
| 2010/0155162 A1 | 6/2010 | Nakamura et al. | |
| 2015/0022125 A1 * | 1/2015 | Takano et al. | 318/139 |

FOREIGN PATENT DOCUMENTS

| | | | |
|---|---|---|---|
| DE | 1994419 | 3/2001 | |
| DE | 19944194 A1 | 3/2001 | |
| JP | 2006180608 A | 7/2006 | |
| JP | 2006/249969 A | 9/2006 | |
| WO | WO 2013137480 A2 * | 9/2013 | H02P 3/00 |

OTHER PUBLICATIONS

Extended European Search Report for EP14184808.5, dated Jan. 4, 2016.

* cited by examiner

*Primary Examiner* — Antony M Paul
(74) *Attorney, Agent, or Firm* — Drinker Biddle & Reath LLP

(57) ABSTRACT

A control device of a fan motor includes: a voltage sensor that detects a voltage applied to a fan motor; a switching portion that selectively connects to each of coils of the fan motor and a rectifier circuit; and a switching control portion that reduces a duty ratio of a driving pulse applied to the switching portion if the voltage detected by the voltage sensor exceeds a threshold.

8 Claims, 6 Drawing Sheets

CONTROL DEVICE OF FAN MOTOR

CROSS-REFERENCE TO RELATED APPLICATIONS

This application claims priority to Japanese Application No. 2013-196058, filed Sep. 20, 2013.

BACKGROUND

1. Technical Field

The present invention relates to a control device of a fan motor that is capable of suppressing a loss of a drive circuit to be a certain value or less even if an input voltage of the fan motor is changed.

2. Description of Related Art

In the related art, for a fan motor, a brushless motor capable of performing speed control over a wide range of speeds is used. The brushless motor includes a plurality of Hall elements as disclosed in Japanese Unexamined Patent Application Publication No. 2006-180608. A control device of the fan motor operates a drive circuit and rotates the brushless motor using a signal output from the Hall elements.

Typically, in a working voltage of the brushless motor, a rated voltage, an upper limit voltage, and a lower limit voltage around the rated voltage are determined. The upper limit voltage of the brushless motor is determined to be a voltage that is less than a permissible loss of the drive circuit built in the brushless motor. Furthermore, air volume-static pressure characteristics when the brushless motor is operated at the rated voltage are also determined.

However, in the control device of the fan motor of the related art, if the input voltage is changed, the input voltage of the brushless motor is also changed. Thus, in order not to exceed the permissible loss of the drive circuit, the rated voltage is inevitably set to be considerably lower than the upper limit voltage. Therefore, it is difficult to further improve the air volume-static pressure characteristics at the rated voltage.

SUMMARY

The present invention is made to solve the problem of the related art described above and an object thereof is to provide a control device of a fan motor capable of suppressing loss of a drive circuit to be a certain value or less by reducing a duty ratio of a driving pulse supplied to the fan motor, if an input voltage of the fan motor is a certain value or more.

The control device of the fan motor according to the invention to achieve the object has a voltage sensor, a switching portion, and a switching control portion.

The voltage sensor detects a voltage applied to the fan motor. The switching portion is selectively connected to each of coils of the fan motor and a power supply. The switching control portion reduces a duty ratio of the driving pulse applied to the switching portion if the voltage detected by the voltage sensor exceeds a threshold.

According to the invention configured as described above, if the voltage applied to the fan motor exceeds the threshold, since the duty ratio of the driving pulse applied to the switching portion is reduced, it is possible to suppress a loss of the drive circuit of the fan motor to be a certain value or less.

Furthermore, since the loss of the drive circuit can be suppressed to be a certain value or less, it is possible to increase the rated voltage and to improve the air volume-static pressure characteristics in the rated voltage.

DETAILED DESCRIPTION

Figure 1:
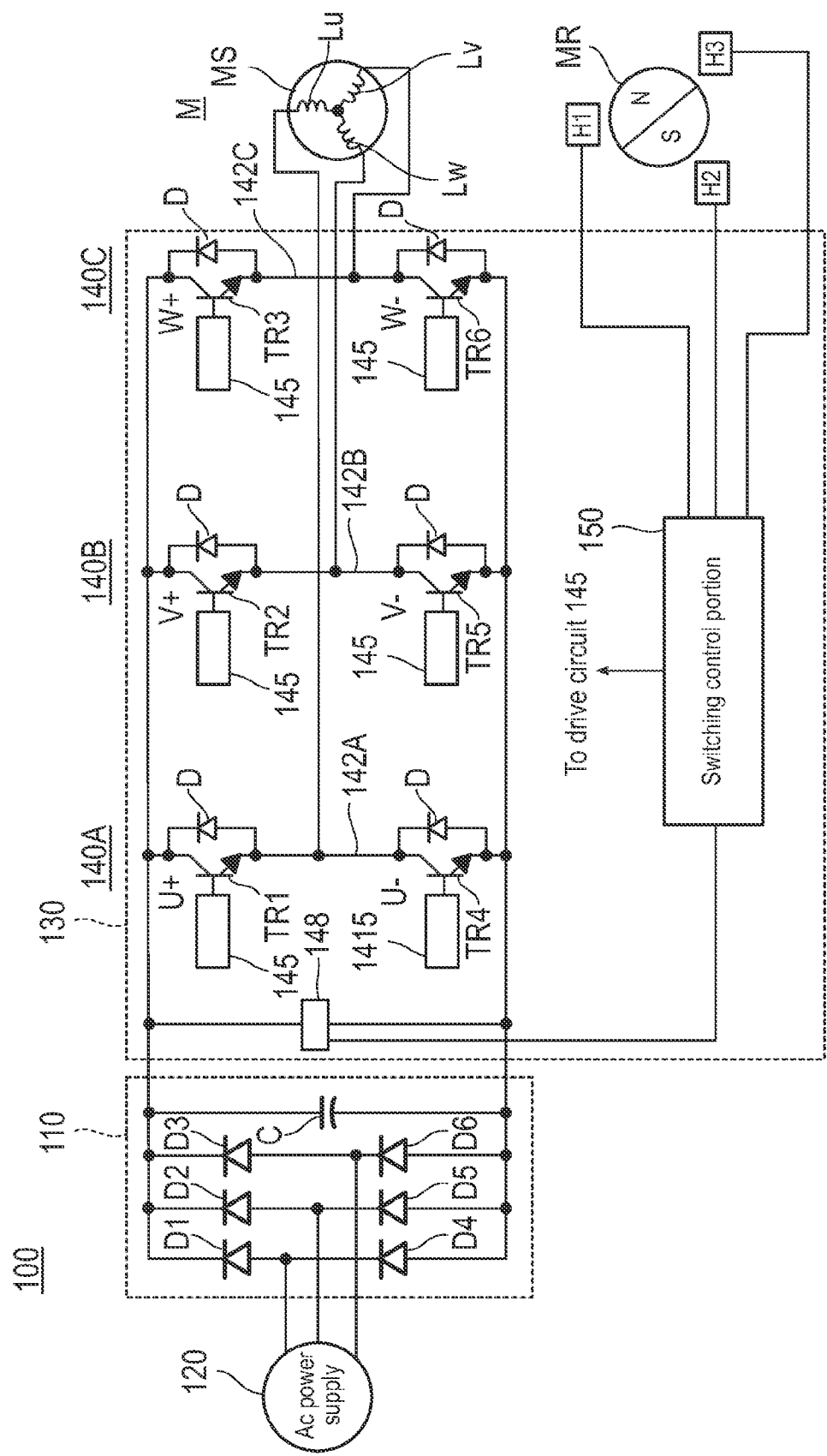
FIG. 1 is a configuration view of a control device of a fan motor according to an embodiment.

Hereinafter, an embodiment of a control device of a fan motor according to the invention will be described.
Configuration of Control Device of Fan Motor FIG. 1 is a configuration view of a control device of a fan motor according to an embodiment.

A control device 100 of the fan motor has a rectifier circuit 110 including a smoothing capacitor C and an inverter circuit 130 connected to a fan motor M. The inverter circuit 130 is formed on a substrate and the substrate is attached to a case of the fan motor M or is built into the case. In the embodiment, the rectifier circuit 110 is included in the control device 100 of the fan motor, but when DC power is supplied from the outside, it is possible to omit the rectifier circuit 110.

As described above, the rectifier circuit 110 has six bridged connection diodes D1 to D6 and six diodes D1 to D6 that full-wave rectify a current flowing from AC power (three-phase) 120. The current that is full-wave rectified by the six diodes D1 to D6 is smoothed by the smoothing capacitor C and the rectifier circuit 110 is a power supply of the fan motor M.

An inverter circuit 130 that is a switching portion is connected to the rectifier circuit 110 in parallel. A voltage sensor 148 is connected between the rectifier circuit 110 and the inverter circuit 130. The voltage sensor 148 detects the voltage applied to the fan motor M. The inverter circuit 130 is selectively connected to each of stator coils (described below) of the fan motor M and the rectifier circuit 110. The inverter circuit 130 has three arm circuits 140A, 140B, and 140C for switching the DC power that is rectified by the rectifier circuit 110.

The arm circuit 140A is connected to a pair of transistors TR1 and TR4 in series, and connects a stator coil Lu of the fan motor M to a connection line 142A that connects between the pair of transistors TR1 and TR4. The arm circuit 140B is connected to a pair of transistors TR2 and TR5 in series, and connects a stator coil Lw of the fan motor M to a connection line 142B that connects between the pair of transistors TR2 and TR5. The arm circuit 140C is connected to a pair of transistors TR3 and TR6 in series, and connects a stator coil Lv of the fan motor M to a connection line 142C that connects between the pair of transistors TR3 and TR6. As illustrated in the view, the stator coils Lu, Lv, and Lw are arranged so as to form a star connection.

Three arm circuits 140A, 140B, and 140C are connected to the smoothing capacitor C of the rectifier circuit 110 in parallel. Diodes D are reversely connected between collectors and emitters of six transistors TR1, TR4, TR2, TR5, TR3, and TR6. Drive circuits 145 for switching the transistors are individually connected to gates of six transistors TR1, TR4, TR2, TR5, TR3, and TR6. A switching control portion 150 (described below) is connected to the drive circuit 145. The drive circuit 145 receives a driving pulse that is output from the switching control portion 150 and turns ON the transistor.

The fan motor M illustrated in the embodiment is a brushless motor. A stator MS of the fan motor M has three stator coils Lu, Lv, and Lw that are arranged so as to form a star connection. A rotor MR of the fan motor M has a cylindrical magnet that is divided into two of N pole and S pole and is magnetized, and the rotor MR is rotated using a magnetic field formed by the stator coils Lu, Lv, and Lw.

Three sensor portions H1, H2, and H3 are arranged around the rotor MR in a rotation direction of the rotor MR. The three sensor portions H1, H2, and H3 are disposed with a phase difference of 120°. For example, as illustrated in FIG. 1, the sensor portions H1, H2, and H3 output a signal of Hi when facing the N pole of the rotor MR and output a signal of Lo when facing the S pole thereof. The signal of Hi and the signal of Lo are switched at a boundary of the N pole and the S pole. The sensor portions H1, H2, and H3 output signals having pulse widths that depend on the rotational speed of the rotor MR.

Moreover, in the embodiment, for the sensor portions H1, H2, and H3, a Hall element is used. However, it is possible to use a sensor other than the Hall element as long as the rotational position of the rotor MR can be detected. The stator coils Lu, Lv, and Lw may be used instead of the sensor portions.

The control device 100 of the fan motor includes the switching control portion 150 to which the sensor portions H1, H2, and H3 are connected. The switching control portion 150 reduces the duty ratio of the driving pulse supplied to the fan motor M when the voltage that is detected by the voltage sensor 148 exceeds a threshold. An output timing of the driving pulse, that is, a timing at which the stator coils Lu, Lv, and Lw, and the rectifier circuit 110 become connected is determined using the rotational position that is detected by the sensor portions H1, H2, and H3.

The switching control portion 150 outputs the driving pulse to each of the drive circuits 145. The duty ratio of the driving pulse that is output from the switching control portion 150 is reduced if the voltage that is detected from the voltage sensor 148 exceeds the threshold. For example, if the upper limit voltage is 14 V exceeding the rated voltage 12 V, the threshold is set to be 14 V, and the duty ratio is reduced if the voltage exceeds 14 V and the loss of the inverter circuit 130 does not exceed a certain value.

Figure 2:
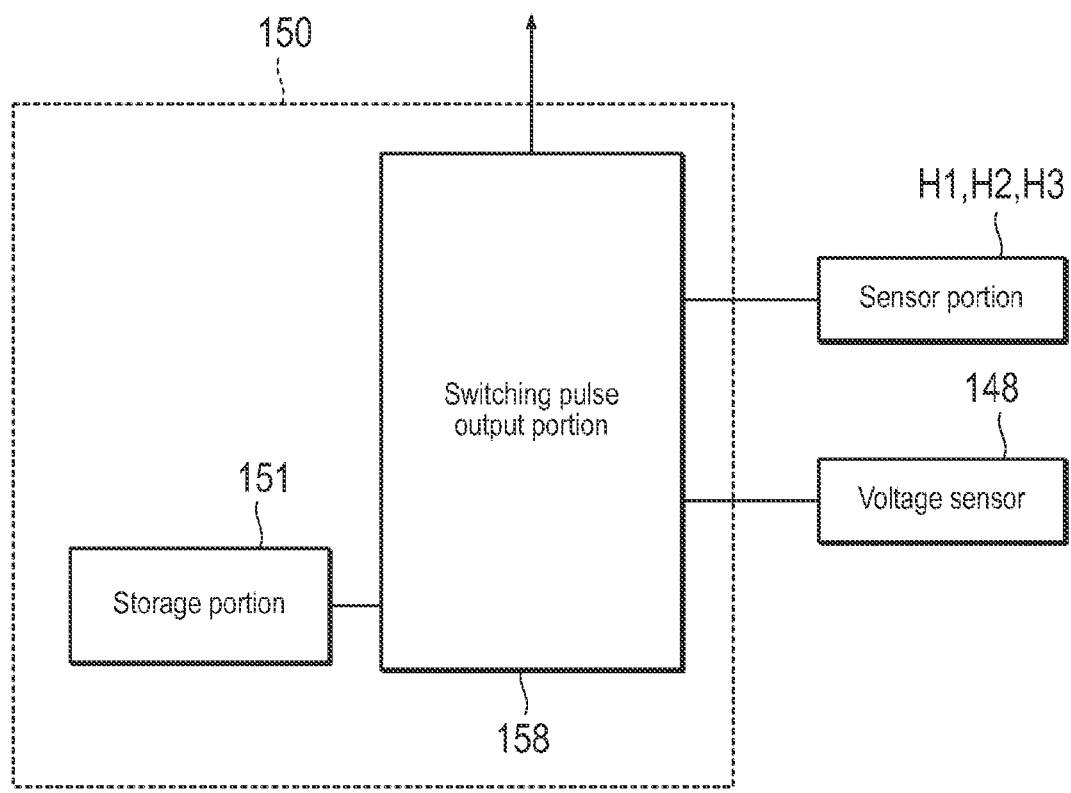
FIG. 2 is a block view illustrating a configuration of a switching control portion illustrated in FIG. 1.

FIG. 2 is a block view illustrating a configuration of the switching control portion 150 illustrated in FIG. 1. The switching control portion 150 has a storage portion 154 and a switching pulse output portion 158.

The storage portion 154 stores the threshold used for obtaining the timing at which the duty ratio is reduced and the duty ratio with respect to the voltage detected by the voltage sensor 148. The storage portion 154 stores a plurality of duty ratios having different sizes. The duty ratios having different values for each voltage are stored, for example, the duty ratio is 80% when the voltage is 13 V and the duty ratio is 60% when the voltage is 14 V.

Furthermore, the storage portion 154 can store linear data that changes linearly or curve linearly so as to obtain a duty ratio that is continuous in a non-step-like manner depending on the size of the voltage after exceeding the threshold in addition to duty ratios that differ in a non-step-like manner for each voltage as described above.

The switching pulse output portion 158 connects three sensor portions H1, H2, and H3, and the voltage sensor 148. Each of three sensor portions H1, H2, and H3 outputs the signals of Hi and Lo that are shifted by 120° in an electrical angle phase by the rotational position of the rotor MR (see FIG. 1). Therefore, the switching pulse output portion 158 can recognize the rotational position of the rotor MR using the signals of Hi and Lo that are output from each of three sensor portions H1, H2, and H3. The voltage sensor 148 detects the voltage applied to three stator coils Lu, Lv, and Lw of the fan motor M.

The switching pulse output portion 158 always compares a voltage value that is detected by the voltage sensor 148 and the threshold that is stored in the storage portion 154. Furthermore, the switching pulse output portion 158 inputs the signals that are output from the sensor portions H1, H2, and H3, and outputs the switching pulse to each of the drive circuits 145 (see FIG. 1) by recognizing the position of the rotor MR.

If the voltage value detected by the voltage sensor 148 does not exceed the threshold, the switching pulse output portion 158 outputs the driving pulse having a predetermined duty ratio to each of the drive circuits 145 after inputting the signals that are output from the sensor portions H1, H2, and H3. On the other hand, if the voltage value detected by the voltage sensor 148 exceeds the threshold, the switching pulse output portion 158 outputs the driving pulse in which the duty ratio is reduced to each of the drive circuits 145.

Operation of Control Device of Fan Motor

Figure 3:
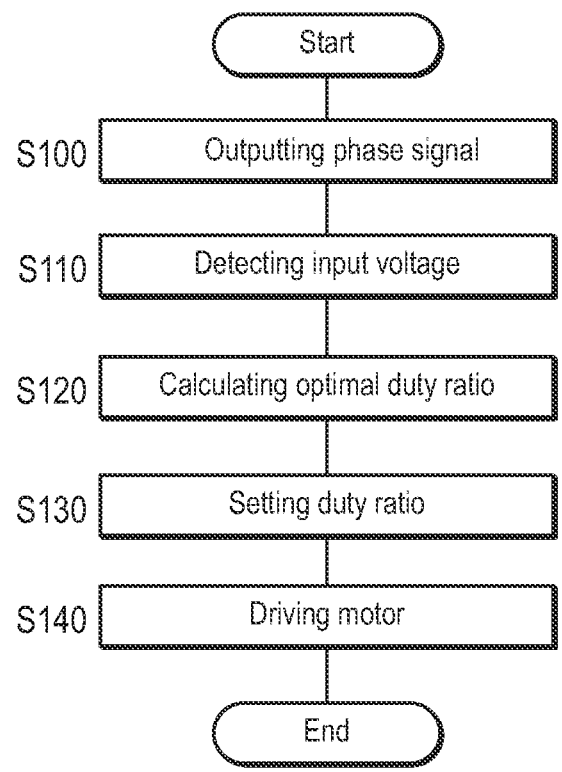
FIG. 3 is a flowchart of an operation of a control device of the fan motor according to the embodiment.

Next, an operation of the control device 100 of the fan motor illustrated in FIG. 1 will be described. FIG. 3 is a flowchart of the operation of the control device 100 of the fan motor.

First, the switching control portion 150 (see FIG. 1) inputs the signals that are output from the sensor portions H1, H2, and H3 and recognizes the rotational position of the rotor MR, and then outputs a phase signal indicating which stator coils Lu, Lv, and Lw are to be electrically connected. The drive circuit 145 to which the phase signal is input switches the transistors TR1 to TR6 according to the driving pulse that is output from the switching control portion 150 the next time. For example, if the phase signal causes the stator coils Lu and Lw to be electrically connected, the transistors TR1 and TR5 perform switching in accordance with to the driving pulse (Step S100).

Next, the voltage sensor 148 detects the input voltage of the fan motor M. Then, the switching pulse output portion 158 (see FIG. 2) inputs the detected input voltage (Step S110).

The switching pulse output portion 158 refers to the threshold stored in the storage portion 154 and the duty ratio with respect to the voltage detected by the voltage sensor 148, and then calculates the optimal duty ratio (Step S120).

The switching pulse output portion 158 sets the calculated duty ratio and outputs the driving pulse of the set duty ratio to the drive circuit 145 (Step S130). The drive circuit 145 switches the transistors TR1 to TR6 and drives the fan motor M with the output driving pulse (Step S140).

Figure 4:
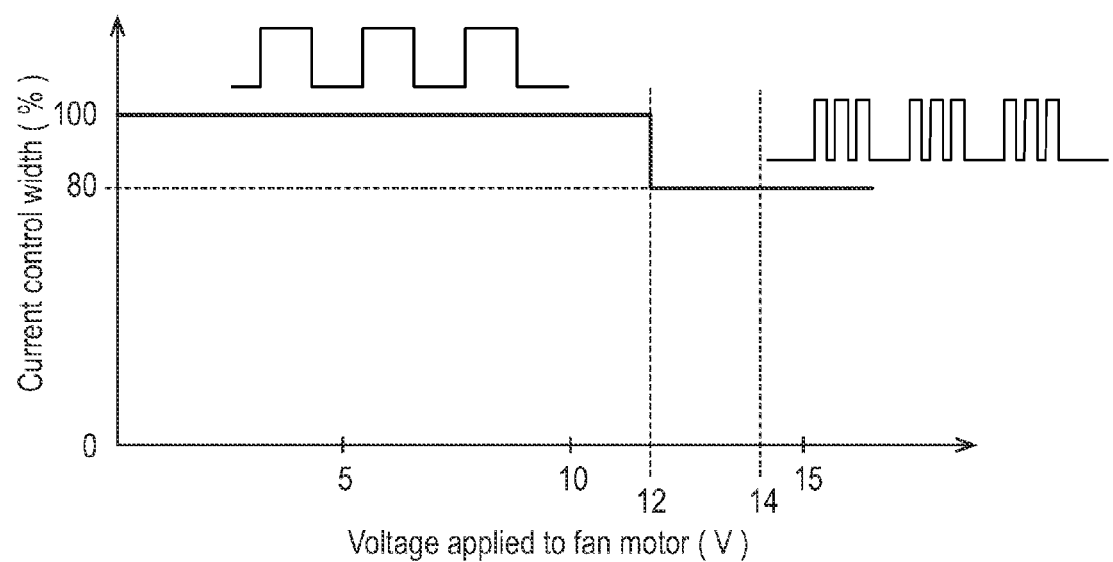
FIG. 4 is a view describing a driving pulse that is output from a switching pulse output portion illustrated in FIG. 2.

FIG. 4 is a view of the driving pulse that is output from the switching pulse output portion 158. FIG. 4 illustrates the driving pulse in the case where the duty ratio that is changed in a step-like manner is stored in the storage portion 154.

As illustrated in the view, when 12 V is set in the storage portion 154 as the threshold, for example, the driving pulse in which the duty ratio is 50% is output from the switching pulse output portion 158 to the drive circuit 145 as illustrated in the view, if the voltage applied to the fan motor M is 12 V or less.

The drive circuit 145 switches the transistors TR1 to TR6 in the driving pulse in which the duty ratio is 50% and drives the fan motor M. At this time, the waveform of the driving pulse is a basic waveform and the first duty ratio is 50%. Moreover, the first duty ratio is changed by the size of the current flowing to the fan motor M. That is, the first duty ratio changes with the load of the fan motor M. For example, if the load is small, the first duty ratio is 50% and if the load is large, the first duty ratio is 80% or 100%.

Furthermore, when an instruction is stored in the storage portion 154 instructing that the duty ratio be 80% if the voltage is 12 V or more, the drive circuit 145 reduces a portion of the HI waveform of the driving pulse of the duty ratio of 50% from the duty ratio of 100% to 80% and switches the transistors TR1 to TR6, and drives the fan motor M.

At this time, the waveform of the driving pulse is a waveform obtained by combining the basic waveform of the duty ratio of 50% and a waveform of a second duty ratio of the duty ratio of 80%. HI and LOW are formed only in a portion forming the HI waveform of the basic waveform slightly at the second duty ratio.

As described above, if the voltage supplied to the fan motor M is reduced using the second duty ratio, it is possible to suppress the power consumed in the inverter circuit 130.

Figure 5:
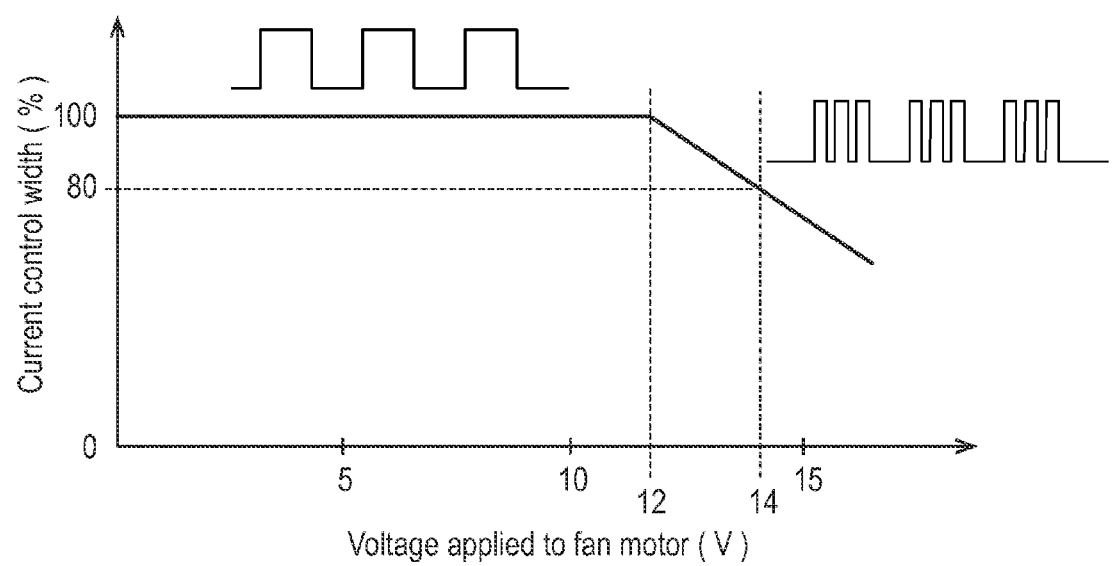
FIG. 5 is a view describing another driving pulse that is output from the switching pulse output portion illustrated in FIG. 2.

FIG. 5 is a view describing another driving pulse that is output from the switching pulse output portion 158. FIG. 5 illustrates the driving pulse if the duty ratio that is changed continuously is stored in the storage portion 154.

As illustrated in the view, when 12 V is set in the storage portion 154 as the threshold, for example, the driving pulse in which the duty ratio is 50% is output from the switching pulse output portion 158 to the drive circuit 145 as illustrated in the view, if the voltage applied to the fan motor M is 12 V or less.

The drive circuit 145 switches the transistors TR1 to TR6 in the driving pulse in which the duty ratio is 50% and drives the fan motor M. At this time, the waveform of the driving pulse is the basic waveform and the first duty ratio is 50%. Similar to the above description, the first duty ratio is changed by the size of the current flowing to the fan motor M. That is, the first duty ratio is changed by the size of the load of the fan motor M. For example, if the load is small, the first duty ratio is 50% and if the load is large, the first duty ratio is 80% or 100%.

Furthermore, when an instruction is stored in the storage portion 154 indicating that the duty ratio be reduced continuously in conjunction with an increase of the voltage from the duty ratio of 100% if the voltage is 12 V or more, the drive circuit 145 reduces the portion of the HI waveform of the driving pulse of the duty ratio of 50% by reducing the duty ratio with the increase in the voltage and switches the transistors TR1 to TR6, and drives the fan motor M.

At this time, the waveform of the driving pulse is a waveform combining the basic waveform of the duty ratio of 50% and the waveform of the second duty ratio of the duty ratio of 80%. HI and LOW are formed only in a portion forming the HI waveform of the basic waveform slightly at the second duty ratio.

As described above, if the voltage supplied to the fan motor M is reduced using the second duty ratio, it is possible to reduce the power consumption in the inverter circuit 130.

Advantage Obtained by Control Device of Fan Motor

Figure 6:
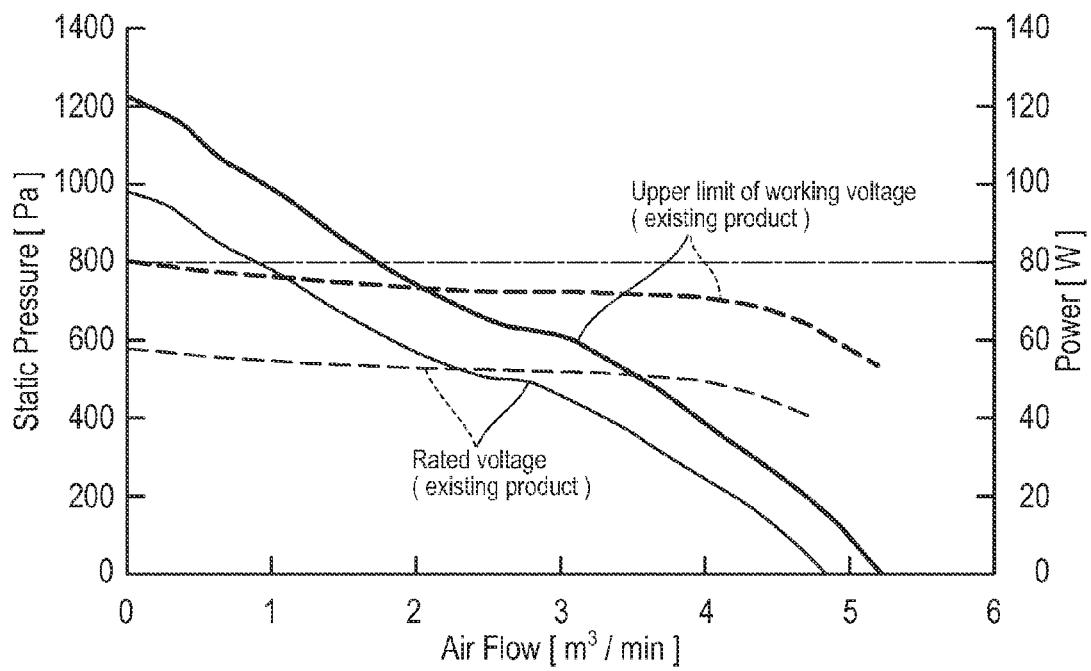
FIG. 6 is a graph illustrating characteristics of a rated voltage and an upper limit of a working voltage of an existing product.

FIG. 6 is a graph illustrating characteristics of rated voltage and the upper limit of the working voltage of an existing product. As illustrated in the view, when using an existing product in the rated voltage, the static pressure is reduced as the air volume is increased. The working power of the fan motor M is also reduced as the air volume is increased. On the other hand, when using the existing product in the upper limit of the working voltage, similar to the case of the rated voltage, the static pressure is reduced as the air volume is increased. Furthermore, the working power is also reduced as the air volume is increased.

However, the static pressure and the working power are increased when using the existing product in the upper limit of the working voltage than when using the existing product in the rated voltage.

Since characteristics of the rated voltage have to be determined in consideration of the loss of the inverter circuit 130 when using the upper limit of the working voltage, when looking at a margin, the characteristics have to be set lower than when those using the upper limit of the working voltage such as in existing products.

Figure 7:
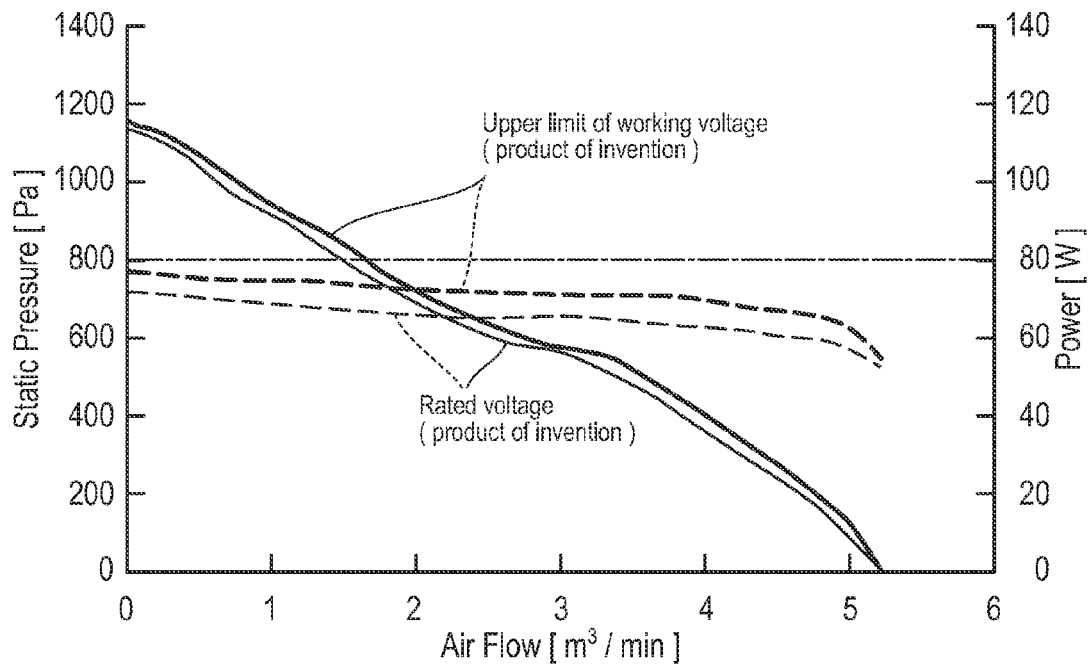
FIG. 7 is a graph illustrating characteristics of a rated voltage and an upper limit of a working voltage of a product of the invention.

FIG. 7 is a graph illustrating characteristics of rated voltage and the upper limit of the working voltage of the existing product. As illustrated in the view, when using the existing product in the rated voltage, the static pressure is reduced as the air volume is increased. Furthermore, the working power of the fan motor M is also reduced as the air volume is increased. On the other hand, when using the product of the invention in the upper limit of the working voltage, similar to the case of the rated voltage, the static pressure is reduced as the air volume is increased. Furthermore, the working power is also reduced as the air volume is increased.

However, there is no difference in the characteristics between the case of using the product of the invention in the rated voltage and the case of using the product of the invention in the upper limit of the working voltage.

Figure 8:
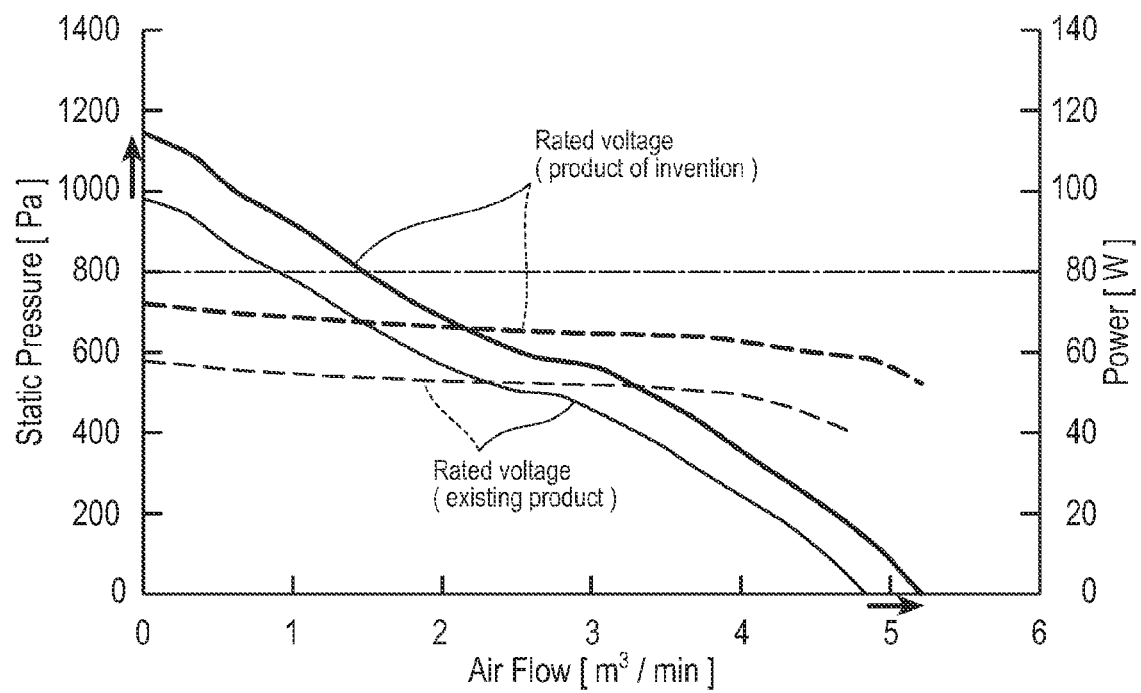
FIG. 8 is a graph illustrating a comparison of characteristics of the existing product and the product of the invention.

FIG. 8 is a graph illustrating a comparison of characteristics of the existing product and the product of the invention. When comparing the characteristics of the product of the invention and the existing product, it can be understood that the characteristics of the rated voltage are considerably raised when using the product of the invention compared to the existing product.

As described above, according to the invention, if the voltage detected by the voltage sensor 148 exceeds the threshold, it is possible to suppress the loss of the drive circuit 145 of the fan motor M to be a certain value or less by reducing the duty ratio of the driving pulse applied to the inverter circuit 130. Furthermore, since the loss of the drive circuit may be suppressed to be a certain value or less, it is possible to increase the rated voltage and to improve the air volume-static pressure characteristics at the rated voltage.

Moreover, in the embodiment described above, a three-phase motor is exemplified, but the spirit of the invention can also be applied to various-phase motors, such as a single-phase motor, a two-phase motor, and a five-phase motor. Furthermore, in the embodiment described above, a case where the number of poles of the rotor is two poles is exemplified, but the spirit of the invention can also be applied to motors having three poles or more. Furthermore, any number of slots can be applied to any of various numbers of motors.

Preferred embodiments of the invention are described in the above, but the embodiments are examples for describing the invention and they are not intended to limit the range of the invention. It is possible to perform the invention in various aspects different from the embodiments described above without departing from the spirit thereof.

The entire disclosure of Japanese Patent Application No. 2013-196058 filed on Sep. 20, 2013 including specification, claims, drawings and summary are incorporated herein by reference in its entirety.

What is claimed is:

1. A control device of a fan motor comprising:
a rectifier circuit that includes a smoothing capacitor;
an inverter circuit that is connected to the rectifier circuit, the inverter circuit serving as a switching portion that selectively connects to each of coils of the fan motor and a power supply;
a voltage sensor that is connected between the rectifier circuit and the inverter circuit, the voltage sensor detecting a voltage applied to a fan motor; and
a switching control portion that reduces a duty ratio of a driving pulse applied to the inverter circuit if the voltage detected by the voltage sensor exceeds a threshold.

2. The control device of a fan motor according to claim 1, wherein the switching control portion includes a storage portion that stores the threshold and the duty ratio with respect to the voltage, and
wherein a plurality of duty ratios having different sizes are stored in the storage portion.

3. The control device of a fan motor according to claim 1, wherein the switching control portion includes a storage portion that stores the threshold and the duty ratio with respect to the voltage, and
wherein the duty ratio that is continuous in a non-step-like manner is stored in the storage portion.

4. The control device of a fan motor according to claim 1, wherein the duty ratio includes a first duty ratio that forms a basic waveform of the voltage and a second duty ratio that forms a HI waveform of the basic waveform.

5. The control device of a fan motor according to claim 4, wherein the first duty ratio is changed depending on a current supplied to the fan motor.

6. The control device of a fan motor according to claim 4, wherein the second duty ratio is reduced if the voltage applied to the fan motor exceeds the threshold.

7. The control device of a fan motor according to claim 4, wherein the second duty ratio is reduced according to an extent that the voltage applied to the fan motor exceeds the threshold.

8. The control device of a fan motor according to claim 1, wherein the voltage sensor is provided between the power supply and the switching portion.

* * * * *